H. P. WEDIN.
PISTON PUMP.
APPLICATION FILED MAR. 1, 1909.

931,535.

Patented Aug. 17, 1909.

2 SHEETS—SHEET 1.

Witnesses
Chas. H. Smith
A. L. Serrell

Inventor
Hans P. Wedin
by Harold Serrell
his atty

H. P. WEDIN.
PISTON PUMP.
APPLICATION FILED MAR. 1, 1909.

931,535.

Patented Aug. 17, 1909.
2 SHEETS—SHEET 2.

Witnesses
Chas H Smith
A L Serrell

Inventor
Hans P. Wedin
by Harold Serrell
his Atty

UNITED STATES PATENT OFFICE.

HANS PERSSON WEDIN, OF CHRISTIANSTAD, SWEDEN.

PISTON-PUMP.

No. 931,535.  Specification of Letters Patent.  Patented Aug. 17, 1909.

Application filed March 1, 1909. Serial No. 480,742.

*To all whom it may concern:*

Be it known that I, HANS PERSSON WEDIN, a subject of the King of Sweden, and resident of Hvilans Gjuteri och Mekaniska Verkstad, Christianstad, in the Kingdom of Sweden, have invented certain new and useful Improvements in Piston-Pumps, of which the following is a specification, reference being had therein to the accompanying drawings.

Piston pumps are before known or proposed, in which a body or plug, rotating in a casing with the driving or crank shaft of the pump and provided with recesses or channels, connecting the pump cylinder with the suction and pressure pipes, is substituted for the ordinary suction and pressure valves. In the said pumps, which, in order to become effective, are provided with a plurality of cylinders, each cylinder is, however, single acting, due to the fact that only the cylinder chamber outside the corresponding piston has a channel leading to the said casing, so that it is connected with the suction and pressure pipes alternately, while the cylinder chamber inside the piston has no channel of the said kind and consequently is inactive.

This invention relates to a piston pump provided with a rotating body or plug of the said type, in which pump the cylinder or each cylinder is double acting. For the said purpose not only the cylinder chamber outside the piston but also the cylinder chamber inside the same has a channel leading to the inner periphery of the said casing, the mouths of the suction and pressure pipes of the pump being besides so located in the inner periphery of the casing, that the rotating body by means of its channels connects the cylinder chambers with the suction and pressure pipes alternately. Through the said arrangements the pump cylinder becomes double acting and has, at least, the same effect as two single acting cylinders together in pumps of the type first mentioned, which pumps, besides, are expensive, cause a great loss of power owing to the friction of the pistons and take up a great deal of space.

Figure 1:
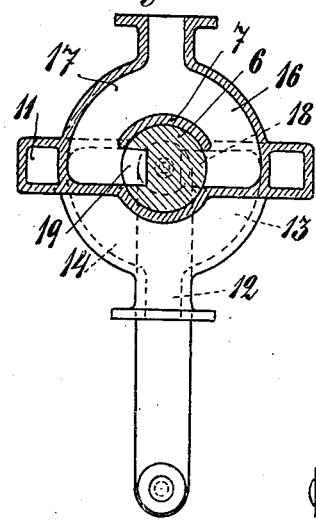
Figure 2:
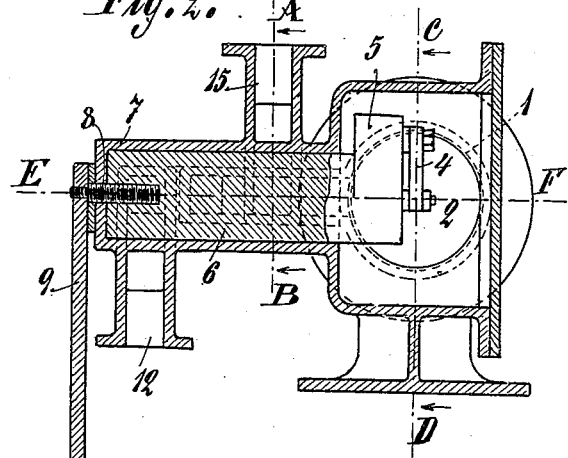
Figure 3:
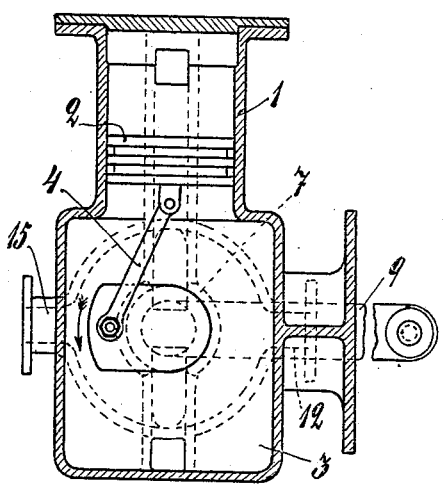
Figure 4:
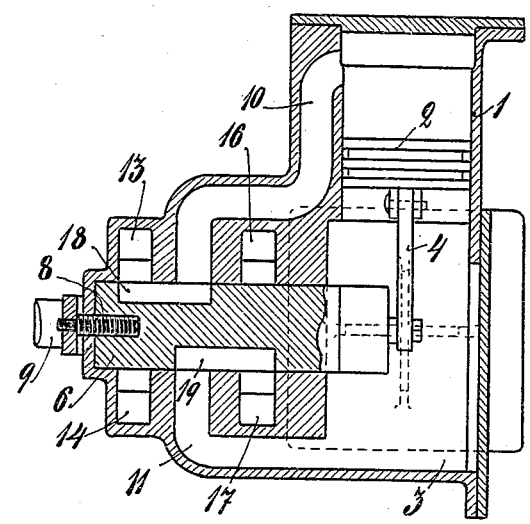
Figure 5:
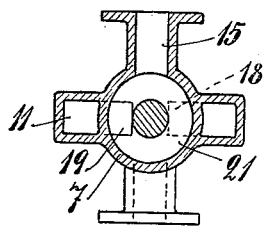

In the accompanying drawings Figures 1 to 4 and 5, 6 illustrate two forms of the invention. Fig. 1 is a section on the line A—B of Fig. 2, viewed in the direction of the arrows, and shows the rotary body, the casing of the same and the suction and pressure pipes of the pump. Fig. 2 is a vertical cross-section of the pump. Fig. 3 is a section on the line C—D of Fig. 2 viewed in the direction of the arrows. Fig. 4 is a horizontal section of the pump on the line E—F of Fig. 2. Fig. 5 is a section on the line G—H of Fig. 6, which is a horizontal section of the pump according to the second form of the invention.

1, Figs. 1 to 4, is the cylinder of the pump and 2 the piston. The inner, open end of the cylinder 1 communicates with the closed crank chamber 3. The piston 2 is connected with a crank 5 by means of a rod 4, the said crank being provided on the inner end of a shaft 6. The said shaft 6 is rotatably mounted in a casing 7 provided on the pump casing and forms in the present case the rotatable body or plug, replacing the valves and effecting the communication between the pump cylinder and the suction and pressure pipes of the pump. A crank 9 is fixed to the shaft or plug 6 by means of a screw 8 for the operating of the pump manually. The pump may, however, easily be arranged to be operated by a motor. Channels 10 and 11 communicate with the chambers on both sides of the piston 2, and the mouths of the said channels are located in the inner surface of the casing 7 in the same or substantially the same cross section of the casing and opposite or substantially opposite each other. The suction pipe 12 of the pump has two branches 13, 14, which embrace the casing 7 and the mouths of which are located in the inner surface of the same on a level with the mouths of the channels 10 and 11 respectively. Also the pressure pipe 15 of the pump has two branches 16 and 17, which embrace the casing 7 and the mouths of which are located also on a level with the mouths of the channels 10 and 11 respectively. The pressure pipe 15 with its branches 16, 17 is located on opposite sides of the mouths of the channels 10, 11 with relation to the branches 13, 14 of the suction pipe 12. Two recesses or channels 18, 19 are provided in the plug 6 on each side of the same and extend in opposite directions from the cross section of the casing, in which the mouths of the channels 10, 11 are situated, so that when the plug 6 is rotated, the channel 18 connects the channels 10 and 11 with the branches 13, 14 of the suction pipe 12 alternately, and the channel 19 connects the channels 10 and 11 with the branches 16, 17 of the pipe 15 alternately. The position of the body 6 is so adapted with relation to the piston 2, that the channel 18 connects the channel 10 with the suction pipe 12, and the channel 19 connects the channel 11 with the pressure pipe 15, as the piston 2 is moved inward, and vice versa as the piston is moved outward.

The pump acts in the following manner. If the shaft or plug 6 is rotated in the direction indicated by the arrow shown in Fig. 3, the water or liquid is sucked through the pipe 12, the branch 13 and the channels 18, 10 into the cylinder chamber outside the piston 2, at the same time as the piston 2 forces the water through the chamber 3 inside the piston, the channels 11, 19, the branch 17 and the pipe 15. As the piston returns to its innermost position, the position of the channels 18, 19 is then reversed, so that the water sucked into the cylinder chamber outside the piston 2 is now forced upward into the pipe 15 through the channels 10, 19 and the branch 16, while water is sucked into the chamber 3 inside the piston through the pipe 12, the branch 14 and the channels 18, 11. Consequently, it is seen, that the pump is double acting. The pipes 12 and 15 may, evidently, entirely inclose the plug 6 and be open inward all around, so that the channels 18, 19 communicate with the same continuously.

Figure 6:
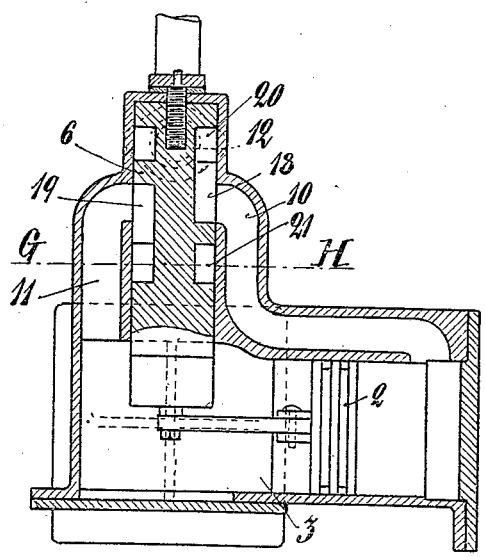

The pump shown in Figs. 5 and 6 differs from the pump described above only by the recesses 18, 19 of the rotatable plug 6 ending in each of two recesses 20, 21 extending around the body 6. The suction pipe 12 ends, without branches, in the casing 7 at the recess 20, and the pressure pipe 15 ends in the same manner at the recess 21.

As the piston 2 is moved inward, water is sucked through the pipe 12, the recess 20 and the channels 18, 10 into the cylinder chamber outside the piston 2, while the water in the chamber 3 inside the piston 2 is forced through the channels 11, 19 and the recess 21 into the pipe 15 and vice versa, as the piston returns.

In both the forms of the invention described above the channels 18, 19 are provided in the surface of the rotatable body or plug 6. They may, however, be provided within the plug and only the mouths of the channels may be located in the surface of the said plug. Further the piston 2 may, evidently, be connected with the plug 6 by means of a gearing or the like substituting the rod 4, as easily understood by those skilled in the art. Two or more cylinders with connecting channels and rotatable plugs of the described type may, evidently be combined in one pump.

Having now described my invention, what I claim as new and desire to secure by Letters Patent is:

1. In a piston pump the combination with the cylinder, the piston and the driving shaft, of a casing, a plug provided in the casing and rotating with the said shaft, channels (10, 11) leading from the cylinder chambers on both sides of the piston to the inner periphery of the said casing, a suction pipe and a pressure pipe, having their mouths located in the casing, and channels provided in the said plug and connecting the channels (10, 11) with the suction and pressure pipes alternately, as the plug is rotated, substantially as described and for the purpose set forth.

2. In a piston pump the combination with the cylinder, the piston and the driving shaft, of a casing, a plug provided in the casing and rotating with the said shaft, channels (10, 11) leading from the cylinder chambers on both sides of the piston to the inner periphery of the said casing, a suction pipe and a pressure pipe, having their mouths located in the inner periphery of the casing, on opposite sides of the mouths of the channels (10, 11), and channels provided in the said plug and connecting the channels (10, 11) with the suction and pressure pipes alternately, as the plug is rotated, substantially as described and for the purpose set forth.

3. In a piston pump the combination with the cylinder, the piston and the driving shaft, of a casing, a plug provided in the casing and dotating with the said shaft, channels (10, 11) leading from the cylinder chambers on both sides of the piston to the inner periphery of the said casing and having their mouths located in the same cross section of the casing, a suction pipe and a pressure pipe embracing the said casing and having their mouths located in the inner periphery of the casing on opposite sides of the said cross section, and longitudinal channels in the said plug connecting the channels (10, 11) with the suction and pressure pipes alternately, as the plug is rotated, substantially as described and for the purpose set forth.

4. In a piston pump the combination with the cylinder and the piston, of a casing, a plug provided in the said casing at right angles to the path of the said piston and forming the driving shaft of the piston, means for rotating the said plug, channels (10, 11) leading from the cylinder chambers on both sides of the piston to the inner periphery of the said casing and having their mouths located in the same cross section of the casing, a suction pipe and a pressure pipe embracing the casing and having their mouths located in the inner periphery of the casing, on opposite sides of the said cross-section, and longitudinal channels in the said plug connecting the channels (10, 11) with the suction and pressure pipes alternately, as the plug is rotated, substantially as described and for the purpose set forth.

5. In a piston pump the combination with the cylinder, the piston and the driving shaft, of a casing, a plug provided in the said casing and rotating with the said driving shaft, channels (10, 11) leading from the cylinder chamber on both sides of the piston to the inner periphery of the said casing, recesses provided in the plug on opposite sides of the mouths of the said channels (10, 11) and extending around the plug, a suction pipe and a pressure pipe communicating with the said recesses respectively, and longitudinal channels in the plug connecting the channels (10, 11) with the said recesses alternately as the plug is rotated, substantially as described and for the purpose set forth.

In witness whereof, I have hereunto signed my name in the presence of two subscribing witnesses.

HANS PERSSON WEDIN.

Witnesses:
J. PERSSON,
JOHN JOHNSON.